US010081512B2

(12) United States Patent
Kato

(10) Patent No.: US 10,081,512 B2
(45) Date of Patent: Sep. 25, 2018

(54) ELEVATOR CONTROL DEVICE

(71) Applicant: MITSUBISHI ELECTRIC CORPORATION, Chiyoda-ku (JP)

(72) Inventor: Toshiaki Kato, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 7 days.

(21) Appl. No.: 15/309,001

(22) PCT Filed: Aug. 6, 2014

(86) PCT No.: PCT/JP2014/070739

§ 371 (c)(1),
(2) Date: Nov. 4, 2016

(87) PCT Pub. No.: WO2016/021004

PCT Pub. Date: Feb. 11, 2016

(65) Prior Publication Data

US 2017/0057778 A1 Mar. 2, 2017

(51) Int. Cl.
*B66B 1/00* (2006.01)
*B66B 1/06* (2006.01)
(Continued)

(52) U.S. Cl.
CPC . *B66B 1/30* (2013.01); *B66B 1/34* (2013.01)

(58) Field of Classification Search
CPC . H02P 27/06; H02P 3/14; B66B 1/302; B66B 1/308
See application file for complete search history.

(56) References Cited

U.S. PATENT DOCUMENTS 5,135,097 A 8/1992 Saito et al.
2001/0017234 A1* 8/2001 Suga ..................... B66B 1/30 187/290

(Continued)

FOREIGN PATENT DOCUMENTS

JP 62-260572 A 11/1987
JP 4-135568 U 12/1992

(Continued)

OTHER PUBLICATIONS

Taiwanese Office Action dated Nov. 28, 2016 in Patent Application No. 103135162 (with partial English translation).

(Continued)

*Primary Examiner* — Marlon Fletcher
(74) *Attorney, Agent, or Firm* — Oblon, McClelland, Maier & Neustadt, L.L.P.

(57) ABSTRACT

An elevator control device which can automatically and appropriately set a bus voltage. Therefore, the elevator control device includes a power supply side current controller, a main circuit bus, an inverter, a regenerative resistance, a bus voltage controller, and a control unit which detects a first reference value of a bus voltage of the main circuit bus when the bus voltage of the main circuit bus becomes a receiving voltage from a power supply, detects a second reference value of the bus voltage of the main circuit bus when the regenerative resistance is turned on, and controls the bus voltage controller so that a value of the bus voltage of the main circuit bus becomes a value between the first reference value and the second reference value.

5 Claims, 3 Drawing Sheets

(51) Int. Cl.
*B66B 1/30* (2006.01)
*B66B 1/34* (2006.01)

(56) References Cited

U.S. PATENT DOCUMENTS

2001/0017235 A1* 8/2001 Suga ........................ B66B 1/30 187/290
2001/0017238 A1* 8/2001 Tajima ...................... B66B 1/30 187/290
2001/0017239 A1* 8/2001 Tajima ...................... B66B 1/30 187/290
2001/0017241 A1* 8/2001 Tajima ...................... B66B 1/30 187/296
2001/0017242 A1* 8/2001 Tajima ...................... B66B 1/30 187/296
2004/0035646 A1* 2/2004 Araki ........................ B66B 5/02 187/290
2005/0224296 A1* 10/2005 Smith ..................... B66B 1/302 187/277
2007/0137945 A1* 6/2007 Takasaki ................... B66B 1/30 187/290
2007/0181375 A1* 8/2007 Araki ........................ B66B 1/30 187/293
2008/0315802 A1* 12/2008 Ueda ....................... B66B 1/308 318/3
2009/0058333 A1* 3/2009 Okada ..................... B66B 1/308 318/380
2010/0078267 A1* 4/2010 Hashimoto ............. B66B 1/302 187/296
2013/0016542 A1 1/2013 Nakamura et al.
2015/0002072 A1* 1/2015 Mo ....................... H02P 27/047 318/807
2018/0041147 A1* 2/2018 Marvin ..................... H02P 6/10

FOREIGN PATENT DOCUMENTS

JP 2507670 B2 6/1996
JP 2006-320134 A 11/2006
JP 2013-39984 A 2/2013
JP 2014-9041 A 1/2014
TW 201134074 A1 10/2011
WO WO 2016021004 A1 * 2/2016 ............... B66B 1/30

OTHER PUBLICATIONS

International Search Report dated Nov. 11, 2014, in PCT/JP2014/070739 filed Aug. 6, 2014.
Taiwanese Office Action dated Aug. 8, 2016, in Taiwanese Patent Application No. 103135162 (with partial English translation).
English language translation of the International Preliminary Report on Patentability and Written Opinion dated Feb. 16, 2017 in PCT/JP2014/070739.
Combined Office Action and Search Report dated Mar. 6, 2018 in Chinese Patent Application No. 201480080403.X (with unedited computer generated English translation), 9 pages.

* cited by examiner

ELEVATOR CONTROL DEVICE

FIELD

The present invention relates to an elevator control device.

BACKGROUND

For example, PTL 1 discloses an elevator control device. The control device includes a regenerative resistance. The regenerative resistance wastefully consumes power generated during regenerative operation of the elevator as heat. Therefore, there is a case where a device which regenerates power to a power supply side is added to the control device including the regenerative resistance.

At this time, if a value of a bus voltage at which the regenerative resistance is turned on is not taken into account, power is continued to be supplied to the regenerative resistance. In this case, the regenerative resistance is overheated. Therefore, a device which regenerates power to the power supply side is manually adjusted. As a result, the value of the bus voltage is appropriately set.

CITATION LIST

Patent Literature

[PTL 1] JP 2013-39984 A

SUMMARY

However, it takes time to manually adjust the device. Manual adjustment becomes a factor of erroneous setting of the bus voltage. Manual adjustment cannot address environmental change.

Technical Problem

The present invention has been made to address the above-described problem. An object of the present invention is to provide an elevator control device which can automatically and appropriately set a bus voltage.

Solution to Problem

An elevator control device according to this invention includes a power supply side current controller having an input part connected to an output part of a power supply, a main circuit bus having an input part connected to an output part of the power supply side current controller, an inverter having an input part connected to an output part of the main circuit bus and having an output part connected to an input part of an electric motor which raises and lowers a car of an elevator, a regenerative resistance connected to the main circuit bus, a bus voltage controller that controls a bus voltage of the main circuit bus, and a control unit that detects a first reference value of the bus voltage of the main circuit bus when the bus voltage of the main circuit bus becomes a receiving voltage from the power supply, detects a second reference value of the bus voltage of the main circuit bus when the regenerative resistance is turned on, and controls the bus voltage controller so that a value of the bus voltage of the main circuit bus becomes a value between the first reference value and the second reference value.

Advantageous Effects of Invention

According to the present invention, a value of a bus voltage becomes a value between a value of the bus voltage when an operation mode of an elevator is a power running mode and a value of the bus voltage when the operation mode of the elevator is a regeneration mode. Therefore, it is possible to automatically and appropriately set the bus voltage.

DESCRIPTION OF EMBODIMENTS

Figure 1:
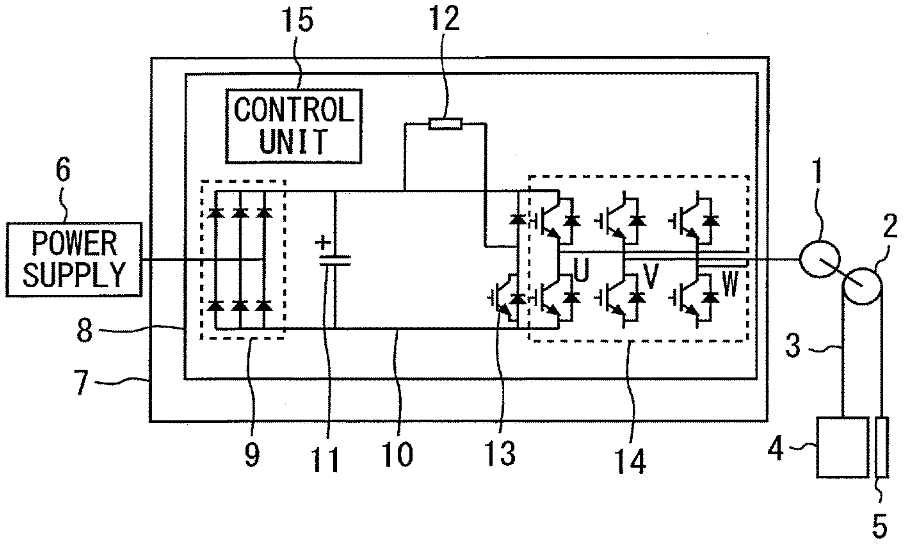
FIG. 1 is a configuration diagram of an elevator before a bus voltage controller is applied to an elevator control device according to Embodiment 1 of the present invention.

Embodiments of the present invention will be described according to the accompanying drawings. It should be noted that the same reference numerals are assigned to the same or corresponding portions in the figures. Overlapped explanation of the portions will be simplified or omitted as appropriate.

Embodiment 1

FIG. 1 is a configuration diagram of an elevator before a bus voltage controller is applied to an elevator control device according to Embodiment 1 of the present invention.

In FIG. 1, a hoistway which is not illustrated pierces through floors of a building. An electric motor 1 is provided in the hoistway. A sheave 2 is attached to a rotation axis of the electric motor 1. A main rope 3 is wound around the sheave 2. A car 4 is provided inside the hoistway. The car 4 is hung on one side of the main rope 3. A counterweight 5 is provided inside the hoistway. The counterweight 5 is hung on the other side of the main rope 3.

For example, a power supply 6 is formed with a commercial power supply. For example, a control device 7 is provided inside the hoistway. The control device 7 is connected between the power supply 6 and the electric motor 1. The control device 7 includes a power converting device 8. The power converting device 8 includes a power supply side current controller 9, a main circuit bus 10, a smoothing capacitor 11, a regenerative resistance 12, a resistance control element 13, an inverter 14 and a control unit 15.

For example, the power supply side current controller 9 is formed with a diode bridge. The power supply side current controller 9 includes a plurality of diode elements. An input part of the power supply side controller 9 is connected to an output part of the power supply 6. An input part of the main circuit bus 10 is connected to an output part of the power supply side current controller 9. The smoothing capacitor 11, the regenerative resistance 12 and the resistance control element 13 are connected to the main circuit bus 10. The inverter 14 includes a plurality of switching elements and a plurality of diode elements. An input part of the inverter 14 is connected to an output part of the main circuit bus 10. An output part of the inverter 14 is connected to an input part of the electric motor 1.

An output part of the control unit 15 is connected to control terminals of the switching elements of the inverter 14. The output part of the control unit 15 is connected to a control terminal of the resistance control element 13.

During power running operation of the elevator, the power supply 6 outputs AC power. The power supply side current controller 9 rectifies the AC power to convert the AC power into DC power. The main circuit bus 10 receives supply of the DC power. The smoothing capacitor 11 smooths the DC power. The inverter 14 converts the DC power into AC power. The inverter 14 supplies the AC power to the electric motor 1.

The electric motor 1 rotates with the AC power. The sheave 2 rotates in accordance with rotation of the electric motor 1. The main rope 3 moves in accordance with rotation of the sheave 2. The car 4 and the counterweight 5 move up and down in accordance with movement of the main rope 3.

During regenerative operation of the elevator, the main rope 3 moves by up and down movement of the car 4 and the counterweight 5. The electric motor 1 rotates in accordance with movement of the main rope 3. The electric motor 1 generates AC power. The inverter 14 converts the AC power into DC power. At this time, the control unit 15 turns on the resistance control element 13. As a result, the regenerative resistance 12 consumes the DC power as heat.

A method for adding a function of regenerating power to a side of the power supply 6 will be described next using FIG. 2.

Figure 2:
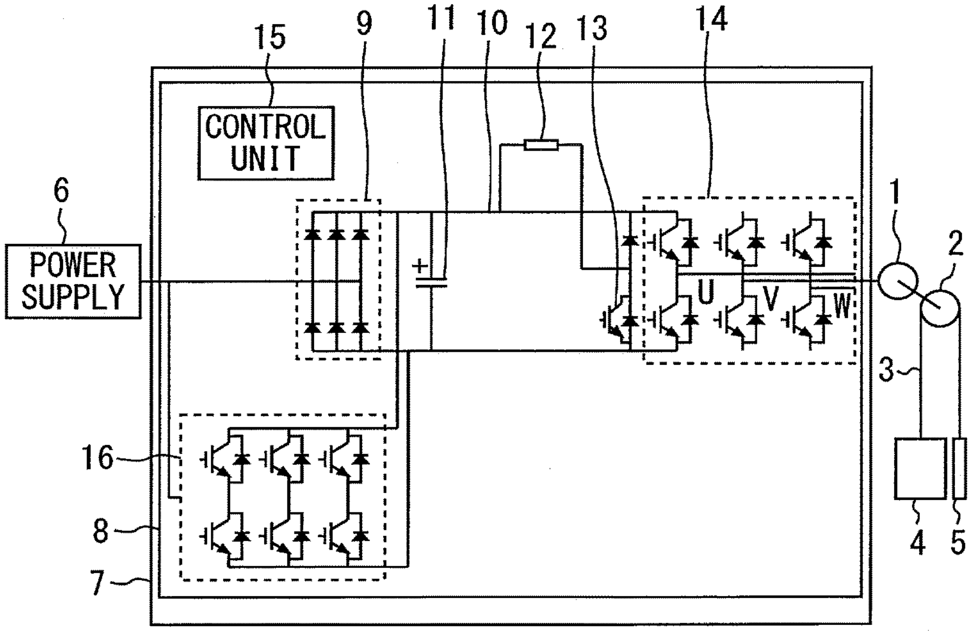
FIG. 2 is a configuration diagram of the elevator after the bus voltage controller is applied to the elevator control device according to Embodiment 1 of the present invention.

FIG. 2 is a configuration diagram of the elevator after the bus voltage controller is applied to the elevator control device according to Embodiment 1 of the present invention.

As illustrated in FIG. 2, the bus voltage controller 16 is added afterward. An input part of the bus voltage controller 16 is connected to the output part of the power supply 6. An output part of the bus voltage controller 16 is connected to the input part of the main circuit bus 10. The bus voltage controller 16 controls a bus voltage of the main circuit bus 10.

For example, a value of the bus voltage of the main circuit bus 10 is controlled to be smaller than a value when the resistance control element 13 is turned on. As a result, during regenerative operation of the elevator, the regenerative resistance 12 does not consume DC power supplied to the main circuit bus 10 as heat. At this time, the bus voltage controller 16 regenerates the DC power to the side of the power supply 6.

Figure 3:
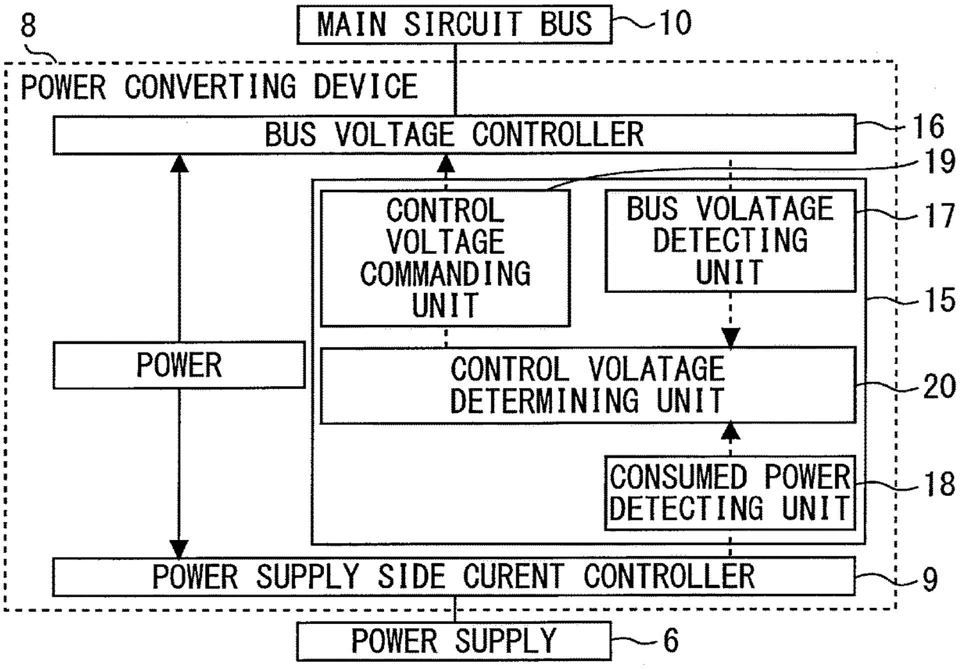
FIG. 3 is a block diagram for explaining the control unit of the elevator control device according to Embodiment 1 of the present invention.

The control unit 15 of the control device 7 will be described next using FIG. 3 FIG. 3 is a block diagram for explaining the control unit of the elevator control device according to Embodiment 1 of the present invention.

As illustrated in FIG. 3, the control unit 15 includes a bus voltage detecting unit 17, a consumed power detecting unit 18, a control voltage commanding unit 19 and a control voltage determining unit 20.

The bus voltage detecting unit 17 detects the bus voltage of the main circuit bus 10 from the bus voltage controller 16. The consumed power detecting unit 18 detects consumed power of the power supply side current controller 9. The control voltage commanding unit 19 controls the bus voltage controller 16 so that the bus voltage of the main circuit bus 10 becomes a control command value. The control voltage determining unit 20 determines a control voltage value on the basis of a detection value detected by the bus voltage detecting unit 17 and a detection state detected by the consumed power detecting unit 18.

Specifically, the control voltage determining unit 20 detects a first reference value of the bus voltage of the main circuit bus 10 when the bus voltage of the main circuit bus 10 becomes a receiving voltage from the power supply 6. The control voltage determining unit 20 detects a second reference value of the bus voltage of the main circuit bus 10 when the regenerative resistance 12 is turned on. The control voltage determining unit 20 determines the control voltage value so that the value of the bus voltage of the main circuit bus 10 becomes a value between the first reference value and the second reference value.

Figure 4:
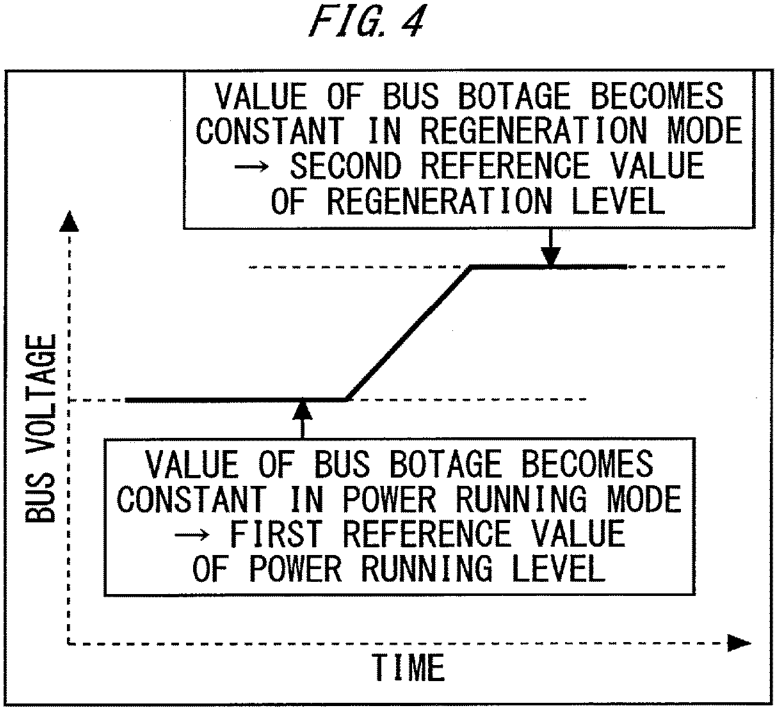
FIG. 4 is a diagram for explaining the method for determining the control voltage value by the elevator control device according to Embodiment 1 of the present invention.

A method for determining the control voltage value will be described next using FIG. 4. FIG. 4 is a diagram for explaining the method for determining the control voltage value by the elevator control device according to Embodiment 1 of the present invention. FIG. 4 indicates time on a horizontal axis. FIG. 4 indicates a bus voltage on a vertical axis.

As illustrated in FIG. 4, when the control voltage determining unit 20 does not determine the control voltage value, the bus voltage is not controlled. At this time, the control voltage determining unit 20 determines an operation mode of the elevator according to whether a detection value of the consumed power detected by the consumed power detecting unit 18 is a positive value or a negative value.

When the operation mode is a power running mode, the value of the bus voltage becomes a peak value of the receiving voltage from the power supply 6. As a result, the value of the bus voltage becomes constant. The control voltage determining unit 20 detects the value of the bus voltage as a first reference value of a power running level. When the operation mode is a regeneration mode, the value of the bus voltage becomes greater than the value when the operation mode is the power running mode. At this time, the regenerative resistance 12 is turned on. As a result, the value of the bus voltage becomes constant. The control voltage determining unit 20 detects the value of the bus voltage as a second reference value of a regeneration level. At this time, the control voltage determining unit 20 sets a value obtained by dividing a value obtained by adding the first reference value and the second reference value by 2, as the control voltage value.

According to Embodiment 1 described above, the control voltage value becomes a value between the value of the bus voltage when the operation mode of the elevator is the power running mode and the value of the bus voltage when the operation mode of the elevator is the regeneration mode. Therefore, it is possible to automatically and appropriately set the bus voltage. Normally, the resistance control element 13 is turned on when the value of the bus voltage becomes the value upon the regeneration mode. Therefore, by automatic setting according to the present embodiment, even during regenerative operation of the elevator, the regenerative resistance 12 is not turned on. As a result, it is possible to prevent the regenerative resistance 12 from being overheated and efficiently regenerate power to the power supply 6. Further, even during power running operation of the elevator, the regenerative resistance 12 is not turned on. As a result, it is possible to prevent power from being wastefully supplied to the regenerative resistance 12 during power running operation of the elevator.

Further, the control voltage value is determined on the basis of the detection value of the bus voltage and the detection state of the consumed power. Therefore, it is possible to automatically and appropriately set the bus voltage on the basis of the values which can be easily detected. Further, even when a power regeneration function is added to the control device 7 including the regenerative resistance 12 afterward, it is possible to automatically determine the control voltage value. Still further, it is possible to address environmental change such as change of each element of the control device 7 and change of an output voltage of the power supply 6.

Embodiment 2

Figure 5:
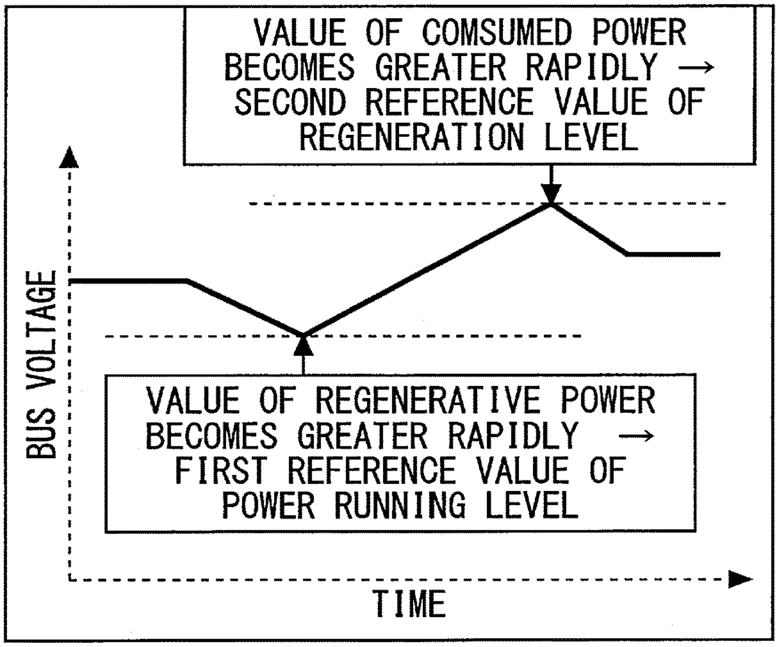
FIG. 5 is a diagram for explaining a method for determining a control voltage value by an elevator control device according to Embodiment 2 of the present invention.

FIG. 5 is a diagram for explaining a method for determining a control voltage value by an elevator control device according to Embodiment 2 of the present invention. FIG. 5 indicates time on a horizontal axis. FIG. 5 indicates a bus voltage on a vertical axis. It should be noted that the same reference numerals are assigned to the portions which are the same as or which correspond to those in Embodiment 1. Explanation of the portions will be omitted.

As illustrated in FIG. 5, the control voltage determining unit 20 gradually lowers the control voltage value. As a result, the bus voltage of the main circuit bus 10 becomes gradually smaller. When the value of the bus voltage of the main circuit bus 10 is about to be smaller than the value of the receiving voltage from the power supply 6, power is flown into the main circuit bus 10 from the power supply side current controller 9. At this time, the bus voltage controller 16 starts regeneration of power from the main circuit bus 10 so as to maintain the control voltage value of the bus voltage of the main circuit bus 10. Therefore, the value of the regenerative power becomes greater rapidly. At this time, the control voltage determining unit 20 detects the value of the bus voltage of the main circuit bus 10 as a first reference value of the power running level.

As illustrated in FIG. 5, the control voltage determining unit 20 gradually increases the control voltage value. As a result, the bus voltage of the main circuit bus 10 becomes gradually greater. When the value of the bus voltage of the main circuit bus 10 is about to be greater than a fixed value, power is consumed by the regenerative resistance 12. At this time, the bus voltage controller 16 starts supply of power to the main circuit bus 10 so as to maintain the control voltage power of the bus voltage of the main circuit bus 10. Therefore, the value of the consumed power becomes greater rapidly. At this time, the control voltage determining unit 20 detects the value of the bus voltage of the main circuit bus 10 as a second reference value of the regeneration level.

Then, the control voltage determining unit 20 sets a value between the first reference value and the second reference value as a final control voltage value. For example, the control voltage determining unit 20 sets a value obtained by dividing a value obtained by adding the first reference value and the second reference value by 2, as the final control voltage value.

According to Embodiment 2 described above, the control voltage determining unit 20 determines the final control voltage value by positively changing the control voltage value. Therefore, it is possible to automatically and promptly determine the final control voltage value.

It should be noted that a diode element or a switching element of at least one of the power supply side current controller 9 and the bus voltage controller 16 may be formed with a wide bandgap semiconductor. For example, when a switching element is formed with a wide bandgap semiconductor, it is possible to reduce a loss at the switching element. As a result, it is possible to improve performance of the power converting device 8.

Further, a wide bandgap semiconductor has high heat resistance. The wide bandgap semiconductor has high allowable current density. Therefore, it is possible to make the switching element or the diode element smaller. As a result, it is possible to make the power converting device 8 smaller.

INDUSTRIAL APPLICABILITY

As described above, the elevator control device according to the present invention can be utilized in a system which automatically and appropriately sets a bus voltage.

REFERENCE SIGNS LIST

1 motor, 2 sheave, 3 main rope, 4 car, 5 counterweight, 6 power supply, 7 control device, 8 power converting device, 9 power supply side current controller, 10 main circuit bus, 11 smoothing capacitor, 12 regenerative resistance, 13 resistance control element, 14 inverter, 15 control unit, 16 bus voltage controller, 17 bus voltage detecting unit, 18 consumed power detecting unit, 19 control voltage commanding unit, 20 control voltage determining unit

The invention claimed is:

1. An elevator control device comprising:

a power supply side current controller having an input part connected to an output part of a power supply;

a main circuit bus having an input part connected to an output part of the power supply side current controller;

an inverter having an input part connected to an output part of the main circuit bus and having an output part connected to an input part of an electric motor which raises and lowers a car of an elevator;

a regenerative resistance connected to the main circuit bus;

a bus voltage controller that controls a bus voltage of the main circuit bus;

a power controller that detects a first reference value of the bus voltage of the main circuit bus when the bus voltage of the main circuit bus becomes a receiving voltage from the power supply, detects a second reference value of the bus voltage of the main circuit bus when the regenerative resistance is turned on, and adjusts the bus voltage controller so that a value of the bus voltage of the main circuit bus becomes a value between the first reference value and the second reference value;

a bus voltage detector that detects the bus voltage of the main circuit bus; and a consumed power detector that detects consumed power of the power supply side current controller;

wherein the elevator control device determines an operation mode of the elevator according to whether a detection value of the consumed power detected by the consumed power detector is a positive value or a negative value, detects as the first reference value a bus voltage of the main circuit bus detected by the bus voltage detector when an operation mode of the elevator is a power running mode in the case where the bus voltage controller does not control the bus voltage of the main circuit bus, and detects as the second reference value a bus voltage of the main circuit bus detected by the bus voltage detector when the operation mode of the elevator is a regeneration mode in the case where the bus voltage controller does not control the bus voltage.

2. The elevator control device according to claim 1, wherein the power controller comprises:

a control voltage detector that detects automatically the first reference value and the second reference value; and a controller that controls the bus voltage controller so that the bus voltage becomes a voltage based on the first and second reference values determined by the control voltage detector.

3. The elevator control device according to claim 1, wherein at least one of the power supply side current controller and the bus voltage controller includes a switching element, and the switching element is formed with a wide bandgap semiconductor.

4. The elevator control device according to claim 1, wherein the bus voltage controller is connected between the output part of the power supply and the main circuit bus.

5. The elevator control device according to claim 4, wherein the bus voltage controller regenerates power from the main circuit bus to the power supply.

* * * * *